Patented Dec. 15, 1925.

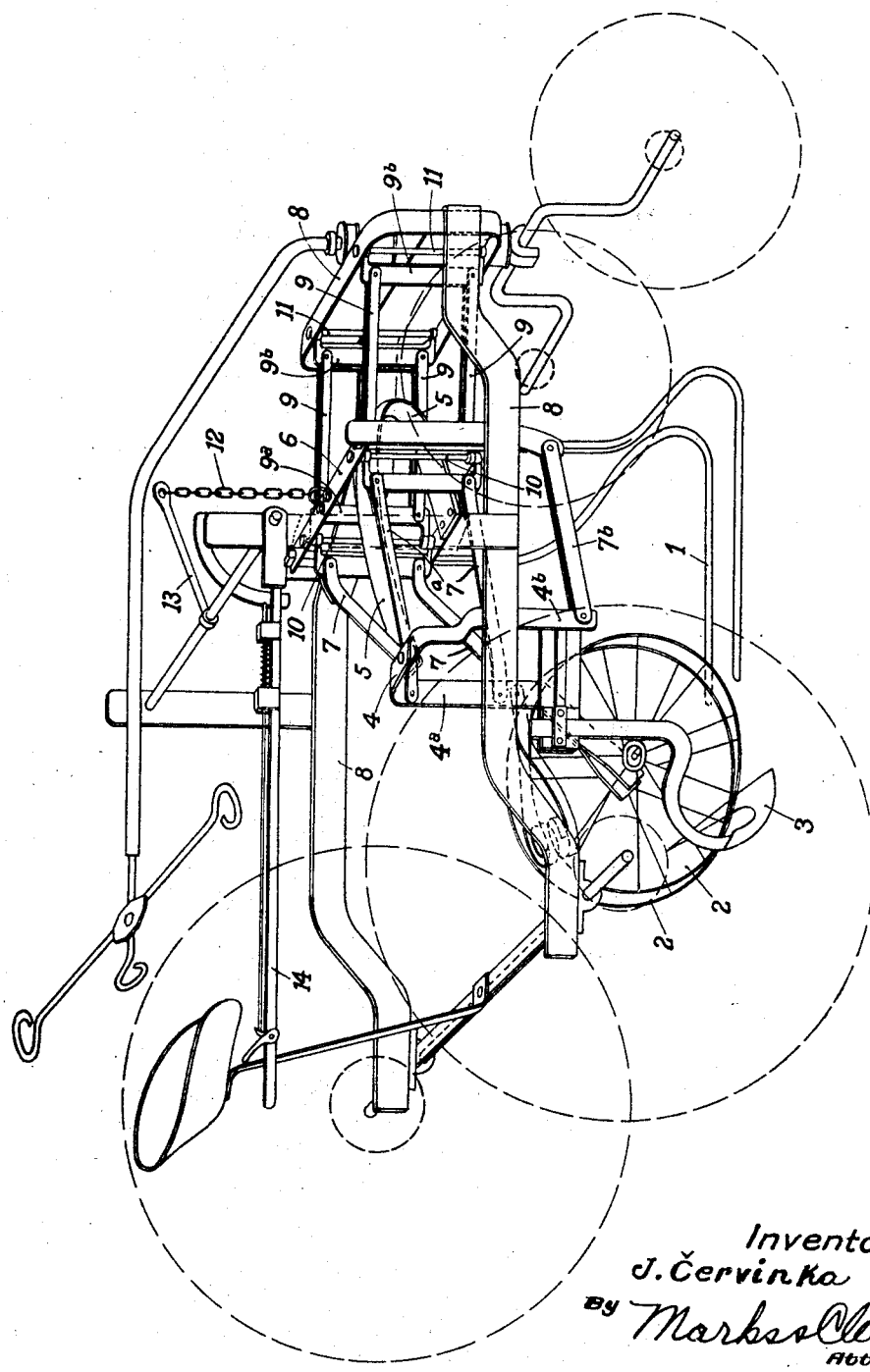

1,565,711

UNITED STATES PATENT OFFICE.

JAN ČERVINKA, OF PRAGUE, CZECHOSLOVAKIA.

MACHINE FOR TOPPING ROOT CROPS.

Application filed February 13, 1925. Serial No. 8,969.

*To all whom it may concern:*

Be it known that I, JAN ČERVINKA, a citizen of Czechoslovakia, and residing at Havlickovonam 32, Prague, Czechoslovakia, have invented a certain new and useful Machine for Topping Root Crops, of which the following is a specification.

The subject of this invention is a machine for topping turnips and the like, a perspective view of which is shown in the accompanying drawing.

The means for performing the topping operation comprise two sledge runners 1, the lower ends of which, which are bent into the horizontal direction and trail on the ground, embrace the row of turnips, two inclined guide wheels 2 located behind the runners and a knife 3.

In accordance with the invention the guide wheels 2 are rotatably journalled on one arm $4^a$ of a supporting stirrup 4, to the other arm $4^b$ of which the knife 3 is attached so as to be vertically adjustable. The supporting stirrup 4 is capable of swinging vertically on the frame 6 by means of five links 7, $7^a$ and $7^b$ forming a link parallelogram, four of which are pivoted to the arm $4^a$ and the fifth to the extended lower end of the arm $4^b$, for the purpose of equalizing the pressure exerted by the knife 3 on the supporting stirrup 4.

The frame 6 is pivoted to the main frame 8 by means of a double link parallelogram, so as to be capable of swinging both horizontally and vertically. This parallelogram consists of links 9 and of vertical members $9^a$, $9^b$, which latter have the form of stirrups capable of turning about vertical pins 10, 11. The frame 6 is suspended by means of a chain 12 to the lever 13, so as to be vertically adjustable by means of a hand lever 14. To the lower member of the frame 6 is also fixed a leaf spring 5, the upper unsupported end of which extends under the stirrup 4, so that the latter is yieldingly supported.

The sledge runners 1, which embrace the row of turnips and are capable of swinging both sideways and vertically, have the purpose of setting the knife 3 and the guide wheels 2 exactly over each turnip to be topped, irrespective of how far out the row it may be. The wheels 2 and the knife 3 follow the lateral movements of the sledge runners 1, but are vertically displaceable with respect to the same owing to the provision of the second pair of links 7. Consequently the wheels 2 which embrace the neck of the turnip will always rest accurately and closely on the top of the turnip and the knife 3, which takes part in their vertical displacement will always cut off the leaves close to the neck of the turnip.

According to the invention the knife 3 consists of a stem bent backwards and inwards somewhat in the form of the upper half of the letter S, which supports the horizontal cutting part, which extends to one side. By the knife being given this shape its elasticity is increased and the catching and carrying along of turnip leaves, grass and the like by the knife is prevented.

The arrangement described can of course be applied to a machine for cutting off several rows at a time.

What I claim is:—

1. A machine for topping root crops, comprising in combination a main frame, a system of links forming a parallelogram pivoted to the said main frame, so as to be capable of swinging horizontally and vertically, a second frame pivotally attached to the said system of links and a pair of sledge runners, a pair of guide members and a topping knife mounted on the said second frame, as set forth.

2. A machine for topping root crops, comprising in combination a main frame, a system of links forming a parallelogram pivoted to the said main frame, so as to be capable of swinging horizontally and vertically, a second frame pivotally attached to the said system of links, a pair of sledge runners supported on the said second frame, a second system of links forming a parallelogram and capable of swinging vertically pivoted to the said second frame, a pair of guide members and a topping knife mounted on the said second system of links, as set forth.

3. A machine for topping root crops, comprising in combination a main frame, a system of links forming a parallelogram pivoted to the said main frame, so as to be capable of swinging horizontally and vertically, a second frame pivotally attached to the said system of links, a pair of sledge runners supported on the said second frame, a second system of links forming a parallelogram and capable of swinging vertically pivoted to the said second frame, means for damping the oscillations of the said second frame, a pair of guide members and a topping knife mounted on the said second system of links, as set forth.

4. A machine for topping root crops, comprising in combination a main frame, a system of links forming a parallelogram pivoted to the said main frame, so as to be capable of swinging horizontally and vertically, a second frame pivotally attached to the said system of links, a pair of sledge runners supported on the said second frame, four links forming a parallelogram and capable of swinging vertically pivoted to the said second frame, a stirrup-shaped frame pivoted to the said four links, a pair of guide members mounted on one arm of the stirrup-shaped frame, a topping knife mounted on the other arm of the stirrup-shaped frame and a link connecting the said latter arm to the said second frame, as set forth.

5. A machine for topping root crops, comprising in combination a main frame, a system of links forming a parallelogram pivoted to the said main frame, so as to be capable of swinging horizontally and vertically, a second frame pivotally attached to the said system of links and a pair of sledge runners, a pair of guide members and a topping knife mounted on the said second frame and having the lower part of its stem bent backwards and inwards somewhat in the shape of the upper half of the letter S, as set forth.

In testimony whereof I have signed my name to this specification.

JAN ČERVINKA.